Sept. 29, 1953   C. J. MAIDA   2,653,747
NOZZLE ATTACHMENT
Filed Feb. 28, 1952
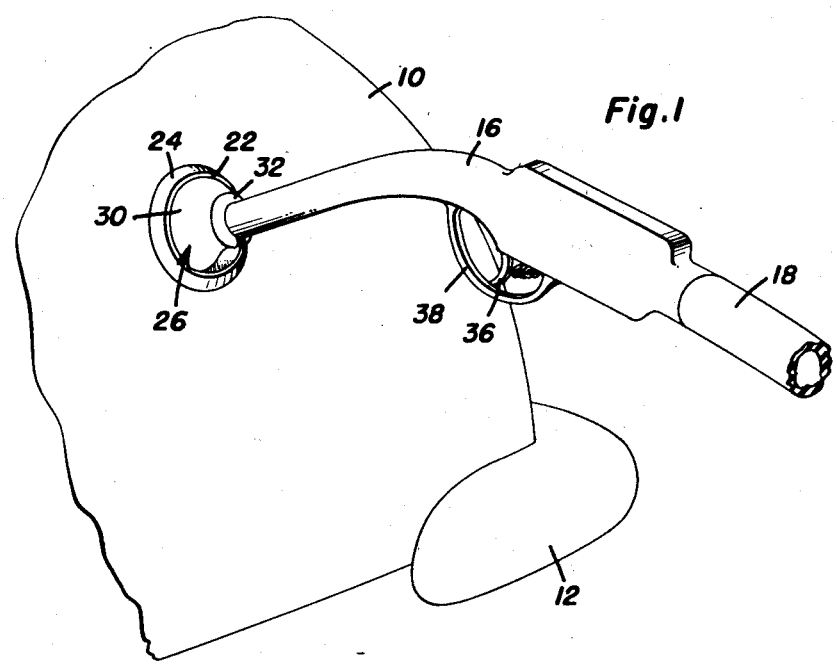
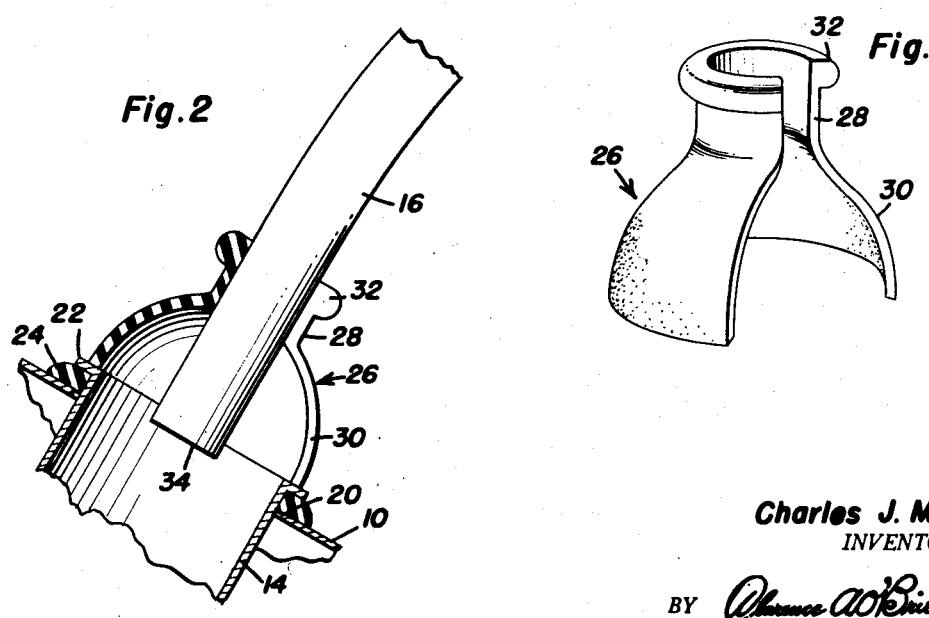
Charles J. Maida
INVENTOR.

Patented Sept. 29, 1953

2,653,747

UNITED STATES PATENT OFFICE 2,653,747

NOZZLE ATTACHMENT

Charles J. Maida, Dorchester, Mass.

Application February 28, 1952, Serial No. 273,950

2 Claims. (Cl. 226—129)

1

This invention relates in general to a nozzle attachment, and more specifically to an attachment for the nozzle of a gasoline pump hose commonly found in the average service station.

A major portion of this country's service stations are constructed with their gasoline pumps mounted in the open in order to reduce the cost of building same. Since the gasoline pumps are in the open, it is obvious that, when the gasoline tank of the vehicle is being filled when it is snowing or raining outside, a certain amount of rain and snow will enter the filler pipe of the gasoline tank of the vehicle during the filling operation. Since the motor of the vehicle will not run properly if the gasoline has water mixed therewith it is obviously desirable to provide some means for excluding rain and snow from the gasoline tank. However, it is obviously necessary that the means for excluding the snow and rain must be relatively inexpensive and completely cover the filler pipe opening during the filling operation.

The primary object of this invention is to provide an improved attachment for the nozzle of a gasoline pump hose whereby the filler pipe opening of a gasoline tank of a vehicle may be conveniently protected against entrance of snow and rain during the filling operation at a service station.

Another object of this invention is to provide an improved attachment for the nozzle of a gasoline pump hose in the form of a shield which may be easily and quickly attached to the nozzle of a conventional gasoline pump and be adapted to enclose the filler pipe opening of a vehicle's gasoline tank when same is being filled by the nozzle.

Another object of this invention is to provide an improved shield for attachment to a gasoline pump nozzle which is of simple construction whereby it may be economically manufactured.

Another object of this invention is to provide an improved shield for attachment to a gasoline pump nozzle for excluding water from the tank of a vehicle while being filled, said shield being formed of a material resistant to deterioration by gasoline.

A further object of this invention is to provide an improved shield for attachment to a gasoline pump nozzle whereby rainwater may be excluded from a filler pipe opening when the tank associated therewith is being filled, said shield having a split lower portion whereby the filler pipe may be vented during the filling operation.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 1 is a perspective view of a conventional automobile being filled by the nozzle of a gasoline pump employing the improved shield which is the subject of this invention, only the rear portion of the automobile being illustrated and only the nozzle and a short length of the hose being shown;

Figure 2 is an enlarged transverse vertical sectional view taken through the nozzle attachment and a portion of the filler pipe of the vehicle's gasoline tank and showing the relationship of the nozzle attachment with respect to both the nozzle and the filler pipe opening; and Figure 3 is an enlarged perspective view of the nozzle attachment or shield and showing the split construction thereof for permitting venting of the gasoline tank with which it is associated during the filling operation.

Similar characters of reference designate similar or identical elements and portions throughout the specification and throughout the different views of the drawings.

Referring now to Figure 1 in particular, it will be seen that there is illustrated the left rear fender 10 of a conventional automobile. Associated with the fender 10 is a portion of the rear bumper 12 and a gasoline tank filler pipe 14 which extends through the fender. The gasoline tank, (not shown) of the vehicle, is being filled by a conventional gasoline pump nozzle 16 which is connected at its rear end to a hose 18.

Referring now to Figure 2 in particular, it will be seen that the filler pipe 14 of the gasoline tank extends through an opening 20 in the fender 10 and has an annular flange projecting outwardly from its outer end. The annular flange is referred to by the reference numeral 22 and engages an annular gasket or cushion 24 disposed around the filler pipe 14 and positions the outer end of the filler pipe 14 with respect to the opening 20 through the fender 10.

It will be readily apparent that since the external diameter of the nozzle 16 is much less than the internal diameter of the filler pipe 14 rain and snow will enter the filler pipe 14 when the gasoline tank is being filled while it is raining or snowing. In order that rain or snow may be excluded from the filler pipe 14, the nozzle 16 of the gasoline pump (not shown) is provided with an attachment in the form of a shield 26. The shield 26 includes a neck portion 28 and a bell portion 30. In order that the shield 26 may be resiliently clamped onto the nozzle 16, the diameter of the neck portion 28 is made slightly less than the diameter of the nozzle 16 and the neck portion 28 is provided with an annular flange 32 at the upper end thereof. The annular flange 32 reinforces the neck portion 28 and resists the changing of diameter of the neck portion 28.

It will be noted by referring to Figure 3 in particular, that the shield 26 has a lower portion thereof removed in order to permit the gasoline tank to be properly vented through the filler pipe 14. Due to the generally C-shaped cross-section of the sleeve 26, the nozzle 16 may be slid through the neck portion 28 and the shield 26 resiliently clamped thereon.

Referring now to Figure 2 in particular, it will be seen that the shield 26 is positioned upon the nozzle 16 so that the outlet end 34 of the nozzle will be positioned within the filler pipe 14 when the gasoline tank is being filled. When the nozzle 16 is in its proper position, the bell portion 30 of the shield 26 engages the annular flange 22 on the outer end of the filler pipe 14 and excludes rain and snow from the filler pipe 14. Since the open portion for permitting venting of the filler pipe 14 is disposed at the bottom of the shield 26, it is obvious that no snow or rain will enter therethrough.

When utilizing a nozzle 16 with the shield 26 mounted thereon, the nozzle is operated in the conventional manner by placing within the filler pipe 14 and pumping gasoline therein. The flow of gasoline through the nozzle 16 is controlled by a thumb mechanism which is actuated by a trigger 36 carried externally of the nozzle 16 and protected by a trigger guard 38.

While the shield 26 has been illustrated and described as engaging the out-turned flange 22 of the filler pipe 14, it will be understood that the relationship between the shield 26 and the filler pipe 14 of different makes of automobiles will vary and it is not intended to limit the shield as engaging the out-turned flange of the filler pipe. However, it will be understood that the shield 26 has a bell portion 30 of a sufficiently large diameter so as to enclose the filler pipe of any conventional type of vehicle.

Since the shield 26 partially encloses the open end of the filler pipe 14, it is obvious that it will be subject to occasional contact with the gasoline that overflows out of the filler pipe 14. In order that the shield 26 does not rapidly deteriorate, it is formed of a material resistant to gasoline such as neoprene.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims.

Having described the invention, what is claimed as new is:

1. An attachment for the nozzle of a gasoline pump hose in the form of a shield for covering the filler opening of a gasoline tank, said shield having a neck portion adapted to resiliently engage a hose nozzle and a bell portion adapted to engage a gasoline tank filler pipe, said shield being generally C-shaped so as to provide an open area through which the gasoline tank may be vented, said open area being adapted to face downward, said neck portion having a thick outwardly directed annular flange whereby said neck portion resists deformation.

2. In combination with a nozzle of a gasoline pump hose, a shield which has a neck portion and a bell portion, said neck portion resiliently engaging said nozzle and retaining said shield thereon for engagement with a gasoline tank filler pipe in order to exclude foreign matter therefrom, said shield being generally C-shaped so as to provide an open area through which the gasoline tank may be vented, said open area being on the under side of said nozzle, said neck portion having a thick outwardly directed annular flange whereby said neck portion resists deformation.

CHARLES J. MAIDA.

References Cited in the file of this patent

UNITED STATES PATENTS

| Number | Name | Date |
| --- | --- | --- |
| 1,970,629 | Scott | Aug. 21, 1934 |
| 2,058,118 | White | Oct. 20, 1936 |